United States Patent [19]
Adachi et al.

[11] Patent Number: 5,729,063
[45] Date of Patent: Mar. 17, 1998

[54] VEHICLE AC GENERATOR

[75] Inventors: Katsumi Adachi; Kazunori Tanaka; Kyoko Kurusu, all of Himeji, Japan

[73] Assignee: Mitsubishi Denki Kabushiki Kaisha, Tokyo, Japan

[21] Appl. No.: 525,145

[22] Filed: Sep. 8, 1995

[30] Foreign Application Priority Data

Dec. 27, 1994 [JP] Japan ................. 6-325305

[51] Int. Cl.$^6$ ............................ H02K 11/00; H02K 1/32
[52] U.S. Cl. ............................ 310/68 D; 310/64
[58] Field of Search ............... 310/680, 89, 91, 310/64; 363/141, 145

[56] References Cited

U.S. PATENT DOCUMENTS

| | | | |
|---|---|---|---|
| 3,160,771 | 12/1964 | Martin et al. | 322/73 |
| 3,253,167 | 5/1966 | Bates et al. | 310/68 D |
| 3,324,383 | 6/1967 | Raver | 310/68 D |
| 4,065,686 | 12/1977 | Moore | 310/68 D |
| 4,161,775 | 7/1979 | Franz et al. | 363/145 |
| 4,329,603 | 5/1982 | Ballard | 310/61 |
| 4,418,295 | 11/1983 | Shiga | 310/59 |
| 4,419,597 | 12/1983 | Shiga et al. | 310/68 D |
| 4,604,538 | 8/1986 | Merrill et al. | 310/68 D |
| 4,835,427 | 5/1989 | Bohm et al. | 310/68 D |
| 4,841,182 | 6/1989 | Tsuciya et al. | 310/68 D |
| 5,138,210 | 8/1992 | Crickmore et al. | 310/68 D |
| 5,258,673 | 11/1993 | Gotoh | 310/68 D |
| 5,473,208 | 12/1995 | Stihi | 310/68 D |

FOREIGN PATENT DOCUMENTS

| | | |
|---|---|---|
| 2 026 597 | 9/1970 | France . |
| 2 031 028 | 11/1970 | France . |
| 2 687 861 | 8/1993 | France . |
| 1 763 840 | 8/1967 | Germany . |
| 2 228 856 | 1/1974 | Germany . |
| 61-180556 | 8/1986 | Japan . |
| 352545 | 3/1991 | Japan . |
| 426346 | 1/1992 | Japan . |

OTHER PUBLICATIONS

Abstract of Japanese Laid Open Patent No. Hei 4–26 346, Hideyuki Takahashi, published Jan. 29, 1992, Abstract of Japan (p. 111 E 1199).

Abstract of Japanese Laid Open Patent No. Hei 3–52545, Teruhiro Mizutani, published Mar. 6, 1991, Abstracts of Japan (p. 126 E 1069).

*Primary Examiner*—Clayton E. Laballe
*Assistant Examiner*—Michael J. Wallace, Jr.
*Attorney, Agent, or Firm*—Sughrue, Mion, Zinn, Macpeak & Seas, PLLC

[57] ABSTRACT

A vehicle AC generator having a rotor located with in a main unit of the generator and journaled at a rotary shaft includes a rectifier unit 21, including a plurality of diodes, a circuit board, and positive-electrode and negative-electrode side cooling plates, for rectifying an AC current. A rear bracket covers at least one of the cooling plates. Preferably, the diodes are soldered to the cooling plates, which are formed in an arcuate-belt shape. Diode leads oppose each other diametrically; connection terminals of the circuit board are collectively spot-welded. The cooling plate is provided with radial cooling fins, allowing air to flow smoothly and, thus, cooling at a relatively high efficiency. The rectifier unit is mounted in the rear bracket, the cooling plate is directly connected to the bracket, and its heat is radiated therefrom. The diodes are arranged such that they overlap diametrically in the generator, allowing its axial length to be reduced.

23 Claims, 11 Drawing Sheets

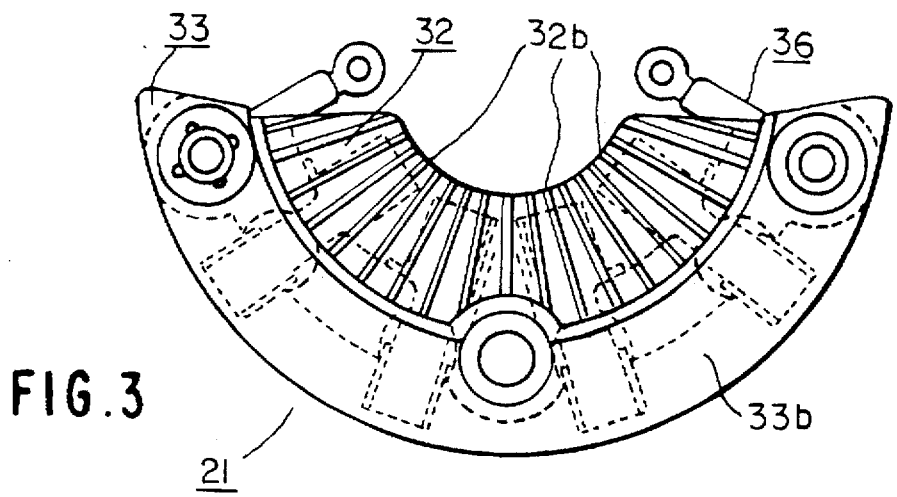
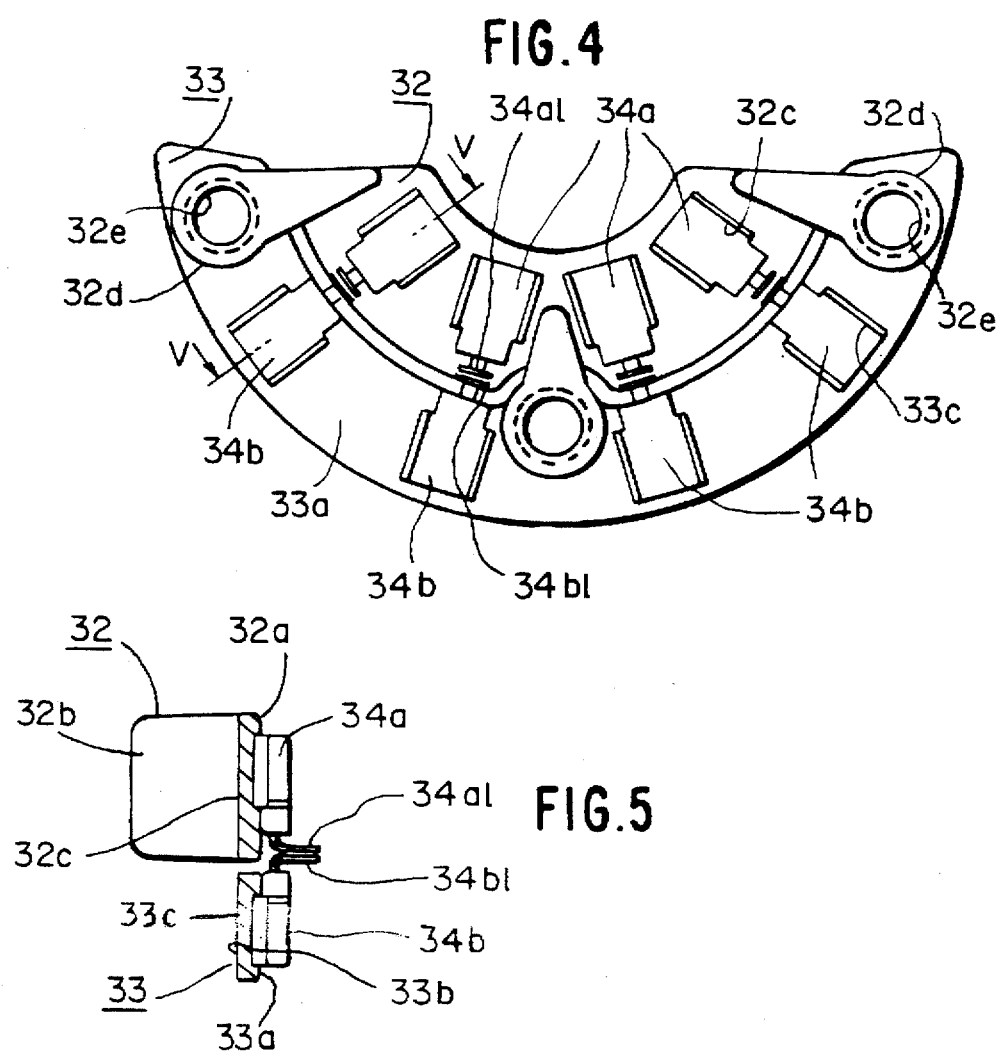

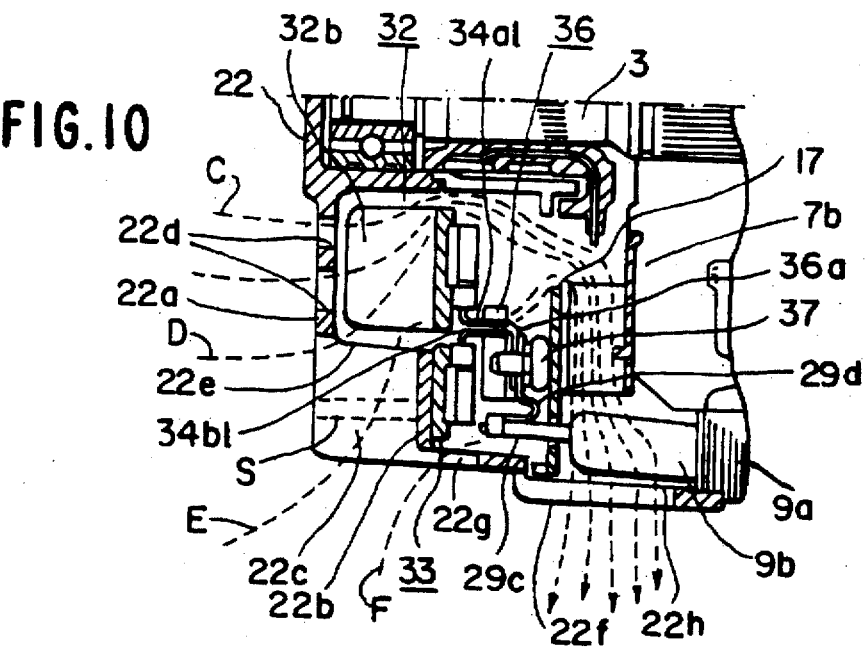
FIG.10
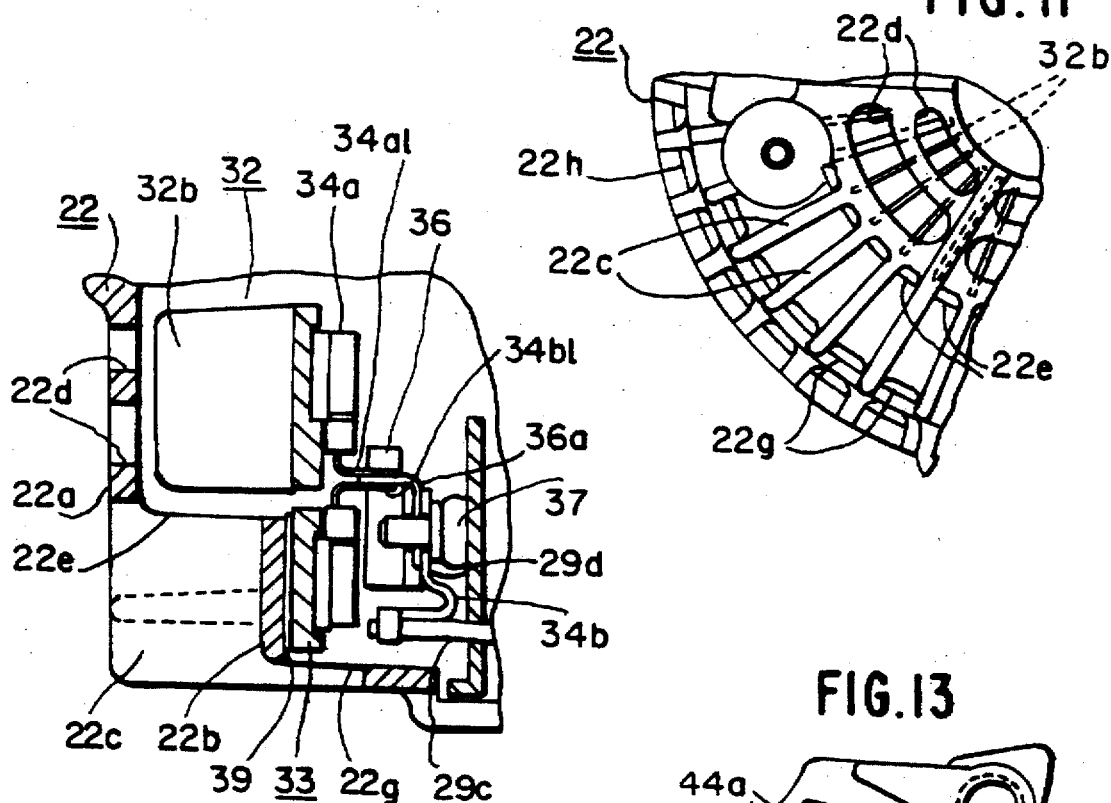
FIG.11
FIG.12
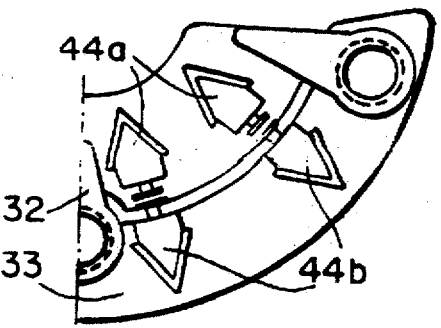
FIG.13

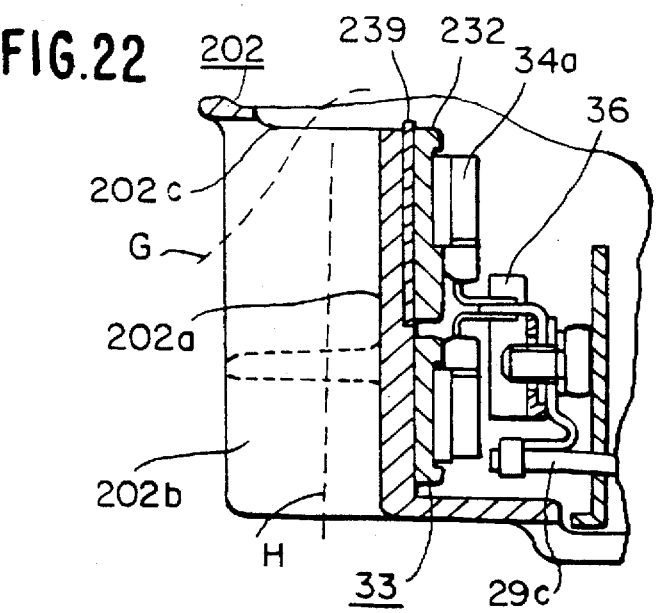
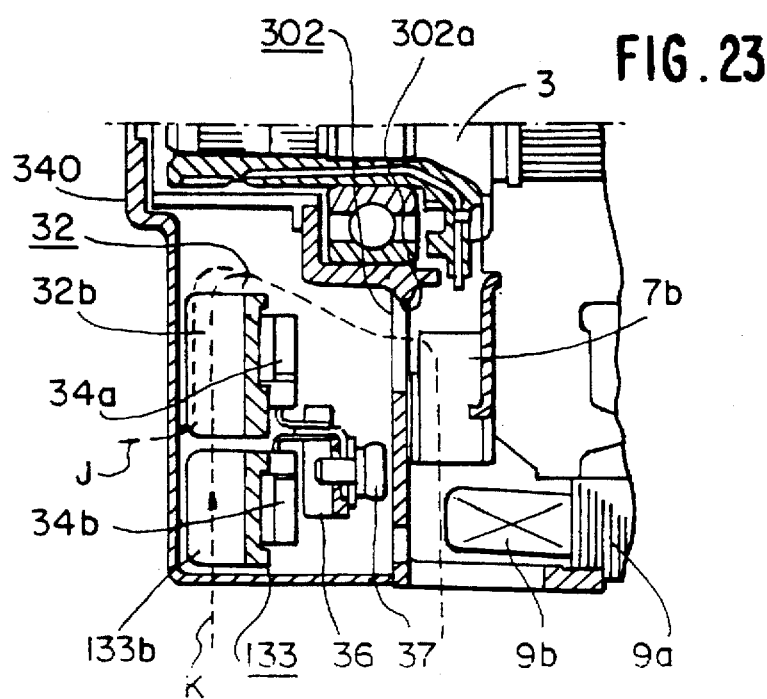

VEHICLE AC GENERATOR

FIELD OF THE INVENTION

This invention relates to AC generators used for vehicles and, more particularly, to improvements to rectifier unit installed therein. Advantageously, the rectifier unit includes a plurality of unidirectionally conducting devices, positive-electrode and negative-electrode side support members, a circuit board, and sections related to the rectifier unit.

DESCRIPTION OF THE RELATED ART

FIG. 24 is a sectional view illustrating a conventional vehicle AC generator, FIGS. 25 and 29 are circuit diagrams of prior art AC generators, FIG. 26 is a perspective view of the rectifier unit of the generator, FIG. 27 is an elevation view of the rectifier unit shown in FIG. 26, and FIG. 28 is an exploded view for describing the assembly procedure of the armature and rectifier unit.

According to these figures, a conventional AC generator includes a front bracket 1, a rear bracket 2, and a rotary shaft 3. The shaft 3 is journaled through front and rear bearings 4a, 4b. Iron field cores 5a and 5b have a plurality of magnetic-pole claws at their outer circumference and cylinder sections at their inner circumference. The field cores 5a and 5b oppose each other in the axial direction with the claws interleaved and, with a coil 6, are attached on the rotary shaft.

Centrifugal cooling fans 7a and 7b are secured to the sides of the field cores 5a and 5b by spot welding. A current collector 8 is attached on the shaft 3 and is electrically connected to the coil 6. The current collector 8 rotates, together with the field cores, as a unit. An armature 9 has an iron core 9a and a coil 9b wound around the core 9a. The ends of the armature coil 9b are provided with a connection terminal group 9c, as shown in FIG. 28, which extends from one end of the armature core 9a, and is formed in an L-shape.

As shown in FIGS. 25 and 28, the terminal group 9c includes three-phase leads 9ca, 9cb, and 9cc, and, in certain cases, a neutral lead 9cn. The armature core 9a is clamped between the front and rear brackets 1, 2 and opposes the field cores 5a and 5b with a small clearance.

A voltage regulator 10 and rectifier unit 11 are included within the rear bracket. The rectifier unit 11 comprises a cooling plate 12 for the positive-electrode side, a cooling plate 13 for the negative-electrode side, diodes 14a for the positive-electrode side supported by the cooling plate 12, and diodes 14b for the negative-electrode side supported by the cooling plate 13.

The cooling plates 12 and 13 have a plurality of straight cooling fins 12a and 13a which extend both perpendicular to and in parallel with the shaft 3, as shown in FIGS. 24, 26 and 27.

The surfaces of the cooling plates 12 and 13, which are disposed parallel to the rotary shaft 3, have rectangular holes 12b and 13b (see FIG. 27) for mounting diodes 14a, 14b on the surfaces opposing the surfaces on which the cooling fins 12a and 13a are provided. The planar base electrodes of the diodes 14a and 14b are connected to the rectangular holes at a predetermined interval by soldering. The cooling plates 12 and 13 are combined such that the rear surfaces of the diodes 14a and 14b oppose each other diagonally. Pairs of the leads 14al and 14bl of the diodes 14a and 14b extend in parallel to the shaft 3 as shown in FIG. 24 and FIG. 26, together with the connection terminals 16a of a circuit board 16, described later, and are soldered to the leads 9ca through 9cc and 9cn of the terminal group 9c of the armature coil 9b introduced by the guide 17a (see FIG. 28) of a partition plate 17, also described later.

The four diodes 14a have anode leads 14al and planar electrode cathodes, and are constructed using a resin-molded type package, as are the four diodes 14b. The diodes 14a and 14b are soldered to the cooling plates 12 and 13 in common, with their cathodes and anodes connected as shown in FIGS. 25 and 27.

A cylindrical molded insulator 15, having a flange, is placed between the cooling plates 12 and 13 and insulates the plates, and the circuit board 16. The circuit board 16 serves as a junction for electrically connecting the armature coil 9b, the voltage regulator 10, the diodes 14a, and the diodes 14b. Connection sections 16b and 16c (see FIGS. 25 and 26) for connecting to the voltage regulator 10 are soldered with connection lines from the voltage regulator 10. The rectifier unit 11 comprises the cooling plates 12 and 13, and the circuit board 16, which are described above.

The partition plate 17 forms a blade opposing the cooling fan 7b in order to obtain the needed amount of cooling air from the fan.

The armature 9 is assembled as follows: After the rectifier unit 11 is mounted on the rear bracket 12 together with other components, the connection terminal group 9c of the armature coil, formed in an L-shape in advance to align with the guide 17a, as shown in FIG. 28, is installed and the terminals are soldered to the leads 14al and 14bl from the inner peripheral side of the armature. Then, the field cores 5a and 5b, attached on the shaft 3, are inserted into the armature.

It will be noted that when an armature is used in which the terminals of the coil 9b have no lead 9cn, as shown in FIG. 29, one of the connection terminals 16a of the circuit board 16, corresponding to the lead 9cn shown in FIG. 28, is not used. Therefore, diodes 14a and 14b corresponding to the lead 9cn are not required.

The generator is driven by an engine, not shown in the figures, through a pulley to generate three-phase electric power at the coil 9b by rotating shaft 3 and the iron field cores 5a and 5b. The rectifier unit 11 performs three-phase full-wave rectification of the AC current generated in coil 9b and supplies the current to loads, as shown in FIG. 25.

The cooling fan 7b rotates together with the iron field core 5b. Outside air is drawn over cooling plates 12 and 13, diodes 14a and 14b, and coil 9b. The air is exhausted to the outside of the generator via the routes indicated by arrows A and B in FIG. 24.

The AC generator described above has the following problems.

a. Because the plane electrodes of diodes 14a and 14b are arranged on a plane parallel to shaft 3, as shown in FIG. 24, the generator is excessively long in the axial direction.

b. Because the surface of cooling plates 12 and 13, on which diodes 14a or 14b are secured, are parallel to the shaft 3, outside air drawn in by cooling fan 7b does not flow smoothly in the routes indicated by the arrows A and B in FIG. 24. Therefore, the cooling efficiency of fins 12a and 13a is poor.

c. Cooling capacity is also reduced since fins 12a and 13a are formed parallel to each other, creating portions in which air does not flow along the fins.

d. Fin 13a, which is positioned at the outside surface, is arranged straight and parallel, forming a cube as shown in FIG. 27. Placing the rectifier unit in the rear bracket 12, having a small diameter, causes the unit to protrude partially from the bracket. This restricts installation of the generator into a vehicle.

SUMMARY OF THE INVENTION

The invention was motivated by a desire to solve the above-described problems. It is an object of the invention to provide an AC generator having a reduced axial length.

Another object of the invention is to provide an AC generator having an improved cooling efficiency with respect to the rectifier unit.

A further object of the invention is to provide an AC generator having improved connectability between the armature coil and the rectifier unit.

An AC generator according to the invention includes a rotor placed in a main unit which is journaled at a rotary shaft. The generator further includes a plurality of unidirectionally conducting devices, a circuit board for electrically connecting the unidirectionally conducting devices, and positive-electrode and negative-electrode side support members for supporting the conducting devices. A casing member covers at least one of the support members, wherein the support members support the conducting devices such that the devices are positioned almost on the same plane perpendicular to the rotary shaft.

The AC generator further includes a cooling fan rotating with the rotary shaft which draws air into the main unit of the generator. Cooling fins are attached to the support member opposite to the side on which the unidirectional conducting devices are supported. The casing member includes an indented section indented from the inside-out in the axial direction of the rotary shaft. The support member from which the cooling fins protrude is disposed within the indented section and that support member is secured to the casing member, thereby enabling the conduction of heat. The fan cools the fins.

The AC generator further includes conductors connected to the positive-electrode side opposite conductors connected to the negative-electrode side. Third connection conductors are placed in between. The first, second, and third connection conductors are electrically connected.

Other objects, features and advantages according to the present invention will become apparent from the detailed description given below. It should be understood, however, that the detailed description and specific embodiments are given by way of illustration only, since various changes and modifications within the spirit and scope of the invention will become apparent to the those skilled in the art from this detailed description.

BRIEF DESCRIPTION OF THE DRAWINGS

FIG. 3 is a rear elevation of the rectifier unit shown in FIG. 1, viewed from below, that is, from a rear bracket.

FIG. 4 is a partial assembly view of the rectifier unit shown in FIG. 1.

FIG. 5 is a sectional view taken along the line V—V of FIG. 4.

FIG. 10 is a sectional view of the main section of a AC generator according to an embodiment of the invention.

FIG. 11 is a partial view of the AC generator of the embodiment shown in FIG. 10, viewed from the rear side, the left-hand side in the figure.

FIG. 12 is a sectional view of the main section of a AC generator according to another embodiment of the invention.

FIG. 13 is an elevation of a part of a rectifier unit according to another embodiment of the invention.

FIG. 22 is a sectional view of the main section of a AC generator according to still another embodiment of the invention.

FIG. 23 is a sectional view of the main section of a AC generator according to yet another embodiment of the invention.

In all figures, the same and the substantially same elements have similar reference numbers.

DETAILED DESCRIPTION OF PREFERRED EMBODIMENTS

Embodiment 1

Figure 1:
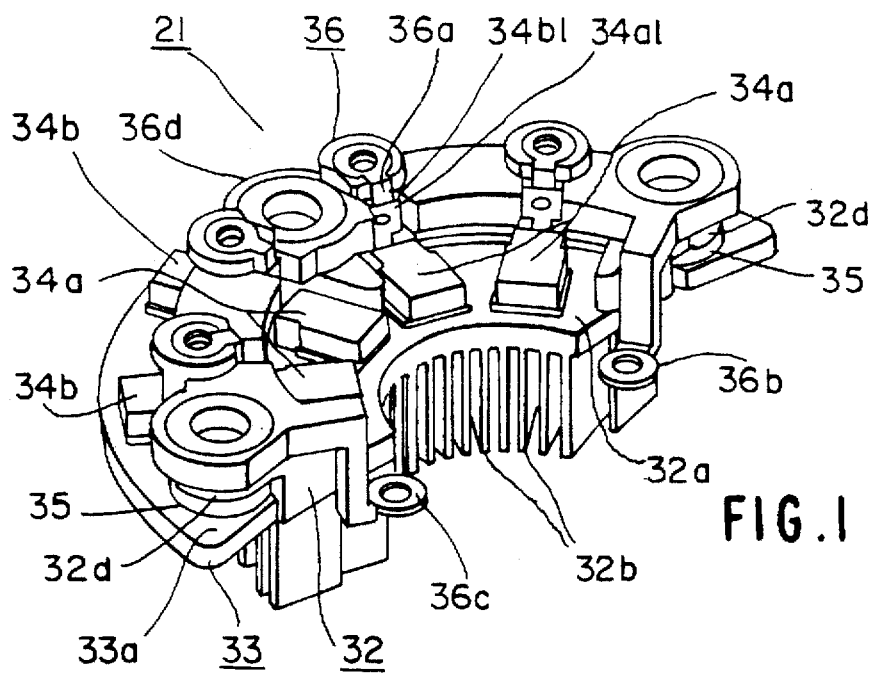
FIG. 1 is a perspective view of a rectifier unit showing an embodiment of the invention.

An embodiment of the invention will now be described while referring to FIGS. 1 to 11. A rectifier unit 21 and a rear bracket 22 serve as a casing member. As shown in FIG. 10 and FIG. 11, the rear bracket 22 is provided with an indented section 22a in which the circular, cup-shaped center section is provided. A direct-mount section 22b, mounted to the outer peripheral section of the indented section 22a, radially forms a unit with plate 33 (described later). Fins 22c have the same pitch angle as cooling fins 32b (described later) and serve to radiate heat. Section S of the fin, represented by the dashed line, has a mountain-like shape, as illustrated in FIG. 10.

The rear bracket 22 shown in FIG. 10 and FIG. 11 is provided with a dented section 22a which only corresponds to cooling fins 32b.

Ellipse shaped vent holes 22d (see FIG. 11 ) are provided for indented section 22a, which extends in the rotary shaft direction. A total of 12 vent holes 22d exist, two of which are placed diametrically and six of which are placed circumferentially. Between the fins 22c, located at the outer peripheral of section 22a, are vent holes 22e. The holes extend radially with respect to the rotary shaft 3. Vent holes 22g exist at the outermost section 22f of the rear bracket 22 and oppose connection terminal group 29c. Vent holes 22h exist at the outermost section 22f of the rear bracket 22 and oppose armature coil end 9b.

Figure 6:
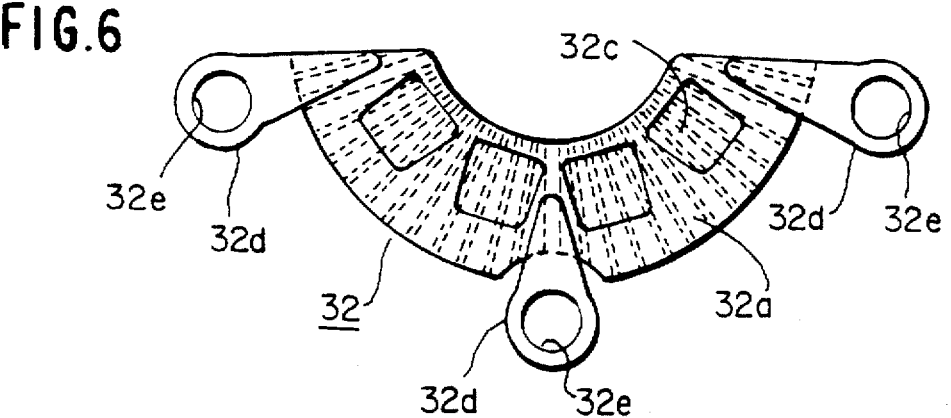
FIG. 6 is an elevation of the cooling plate for the positive-electrode side of the rectifier unit shown in FIG. 1.

Cooling plate 32, which is shaped like an arcuate-belt, serves as a support member and has a plane mounting surface 32a at one end, and cooling fins 32b, which protrude radially toward the bottom, at the other end. The cooling plate 32 and the cooling fins 32b are integrally formed using dye cast aluminum alloy. Three overlap-joint sections 32d and fixing holes 32e are placed in a circumferential direction of the cooling plate 32. The sections and holes protrude outside diametrically and are aligned with the cooling plate 33 along the rotary shaft 3, as shown in FIGS. 4 and 6. Among the three fixing holes 32e, the end one, which corresponds to a connection section 36b (right side FIG. 1), is used as a B terminal connected to a battery through the rear bracket 22.

On the mounting surface 32a, four, rectangular, indented holes 32c for mounting diodes (see FIG. 6), are formed radially to which diodes 34a (described later) are soldered.

Figure 7:
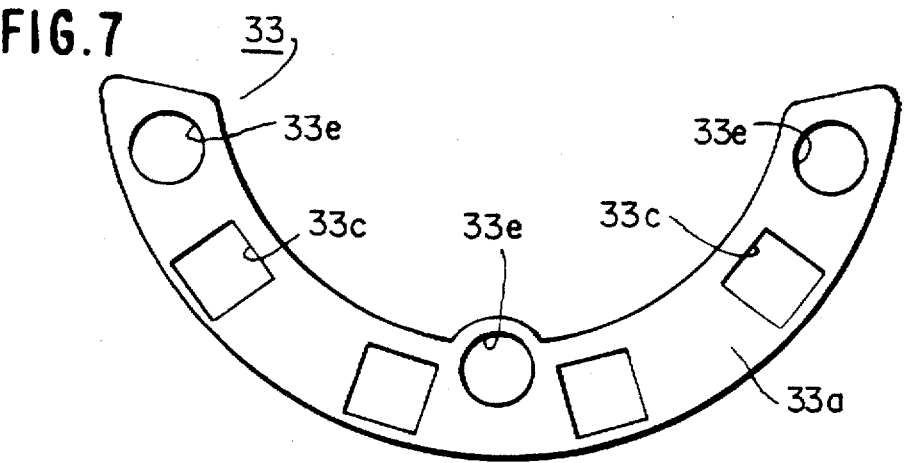
FIG. 7 is an elevation of the cooling plate for the negative-electrode side of the rectifier unit shown in FIG. 1.

Cooling plate 33, made from dye cast aluminum alloy, serves as a second support member and is shaped like an arcuate-belt. Cooling plate 33 has a larger curvature than cooling plate 32. Therefore, one surface serves as a mounting surface 33a and the other surface serves as a plane direct-mount surface 33b. The cooling plate 33, as shown in FIGS. 1 and 7, is provided with fixing holes 33e which are aligned with the overlap-joint sections 32d of cooling plate 32 along the rotary shaft 3. On the mounting surface 33a, four rectangular indented holes 32c for mounting diodes (see FIGS. 4 and 7) are formed radially, to which diodes 34b are soldered. The diode mounting holes 32c and 33c are indented in order to determine the position of the diodes 34a and 34b and to prevent solder from flowing out.

Cooling plate 33 diametrically overlaps cooling plate 32 with a certain clearance set diametrically outside the cooling plate 32. Mounting surfaces 32a and 33a are positioned on a surface perpendicular to the rotary shaft 3. The cooling plate 32 is mounted in the indented section 22a of the rear bracket 22. The cooling plate 33 is directly mounted such that the mounting surface 33b, the surface opposite of that which the diode mounting holes 33c are provided, is mounted to the direct-mount section 22b of the rear bracket 22 with enough contact area for conducting heat (see FIGS. 5 and 10). Each of the radial cooling fins 32b and 22c are arranged such that they overlap diametrically.

An AC generator, according to one embodiment of the invention, uses the negative-electrode side grounding method.

Diodes 34a and 34b serve as unidirectionally conducting devices for the positive-electrode and negative-electrode sides, respectively. Anode leads 34al serve as first connection conductors and cathode leads 34bl serve as second connection conductors. Both are extracted from the diode mold packages and are L-shape-bent at the ends as shown in FIG. 5. The diodes 34a and 34b are soldered to the diode mounting holes 32c and 33c of the cooling plates 32 and 33 such that the leads 34al are diametrically opposed to the leads 34bl with a predetermined clearance. The base electrode surfaces of the diodes 34a and 34b have good contact condition electrically and thermally.

Figure 9:
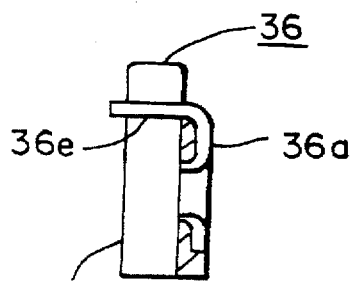
FIG. 9 is a sectional view taken along the line IX—IX of FIG. 8.
Figure 8:
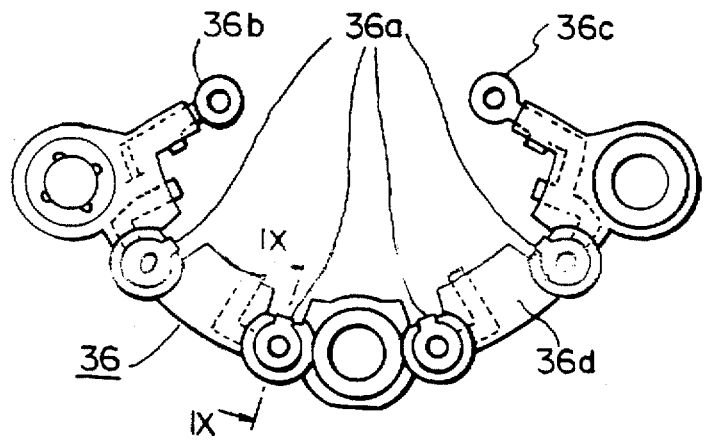
FIG. 8 is an elevation of the circuit board of the rectifier unit shown in FIG. 1.

The cooling plate 32 and the cooling plate 33 side are overlapped at the fixing holes 32e and 33e, and insulated by a hollow, cylindrical mold insulator 35 (see FIG. 1) having a flange section at the middle. A circuit board 36 has an arcuate-belt-shaped insulation support member 36d insert-molded with a insulation molding material as one unit, and is arranged such that four copper connection terminals 36a, having male threads as shown in FIG. 8, are nearly aligned with the leads 34al and 34bl of the diodes 34a and 34b. Reed sections 36e, serving as a third connection conductor, are connected to the leads 34al and 34bl and are L-shape bent as shown in FIG. 9.

Figure 2:
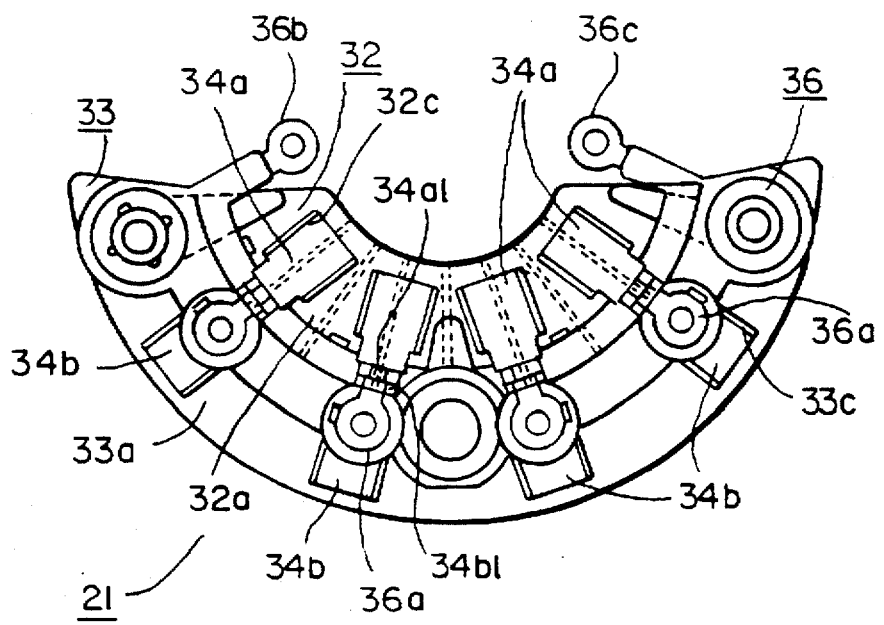
FIG. 2 is an elevation of the rectifier unit shown in FIG. 1, viewed from above, that is, from an armature.
Figure 25:
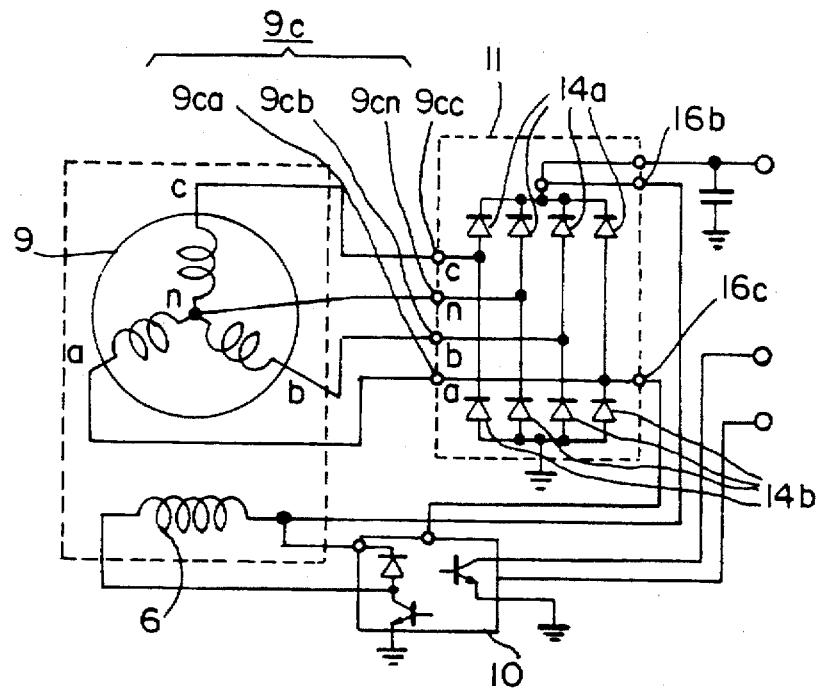
FIG. 25 is a circuit diagram illustrating an example of a circuit used in the conventional AC generator.
Figure 29:
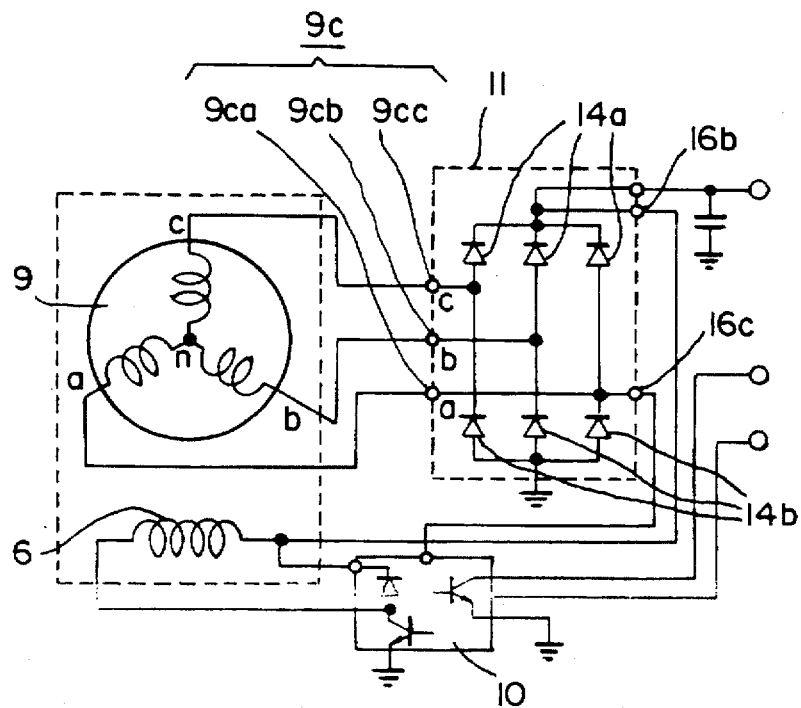
FIG. 29 is a circuit diagram of another example of a circuit used in the conventional AC generator.
Figure 26:
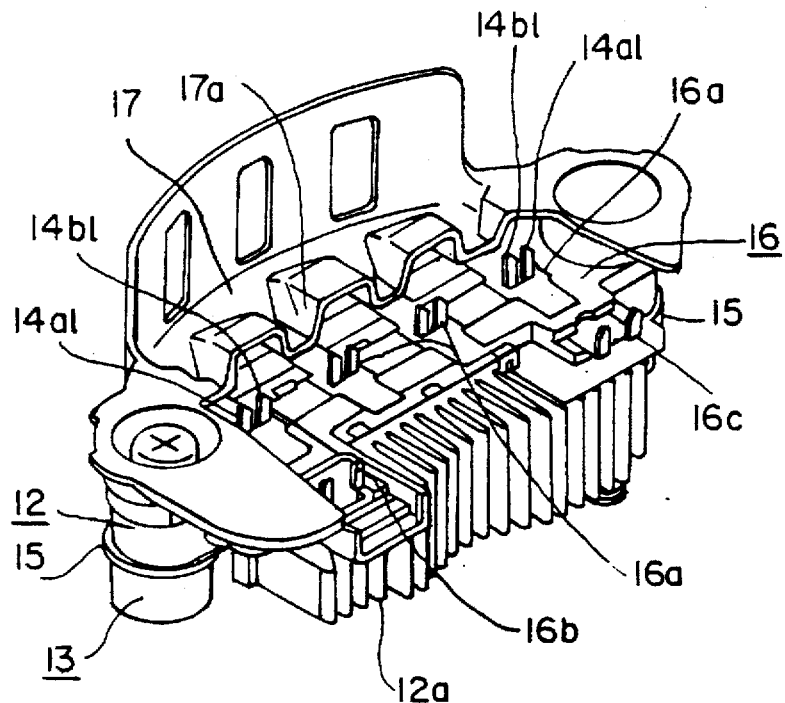
FIG. 26 is a perspective view of the rectifier unit of the conventional AC generator.
Figure 27:
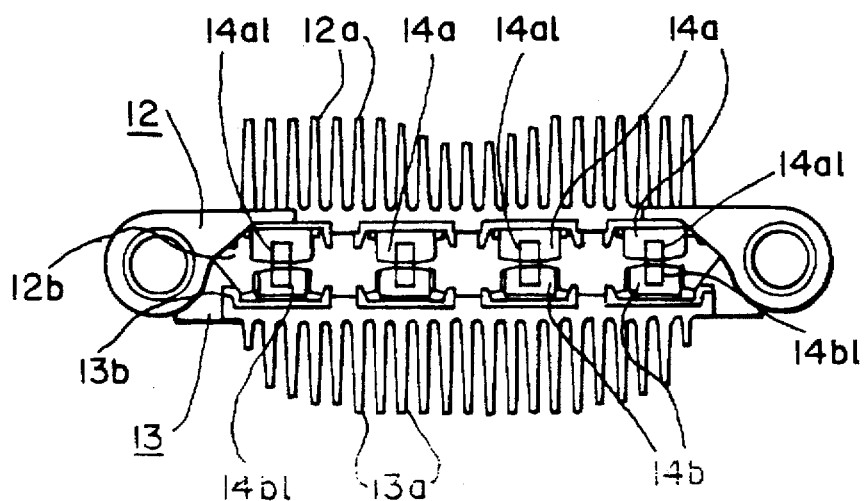
FIG. 27 is an elevation view of the rectifier unit shown in FIG. 26, viewed from above the figure.
Figure 28:
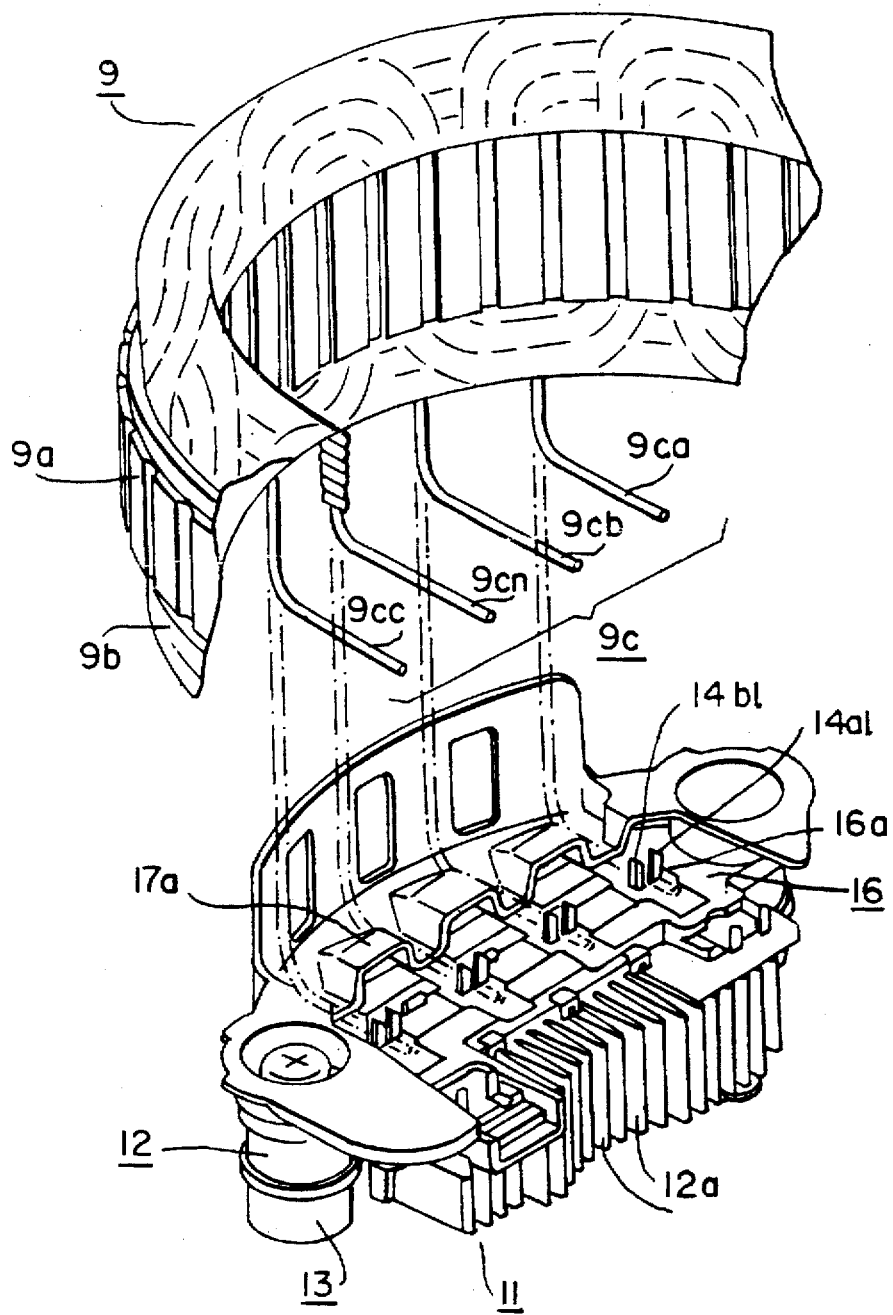
FIG. 28 is a view for explaining the assembly procedure of the armature and the rectifier unit of the conventional AC generator.

The circuit board 36 is provided with connection sections 36b and 36c used for connecting the board to a voltage regulator, not shown in FIGS. 1–11 (see the circuit diagram in FIG. 25). The connection section 36b electrically contacts the peripheral section of the fixing hole 32e on the surface of the cooling plate when the circuit board 36 overlaps the cooling plates 32 and 33 as shown in FIG. 1 and FIG. 2. The connection section 36c, together with the connection terminals 36a act as one conductive unit, as shown with a dashed line in FIG. 8. At the circular terminal portions of the connection sections 36b and 36c, male threads are formed as shown in FIG. 8.

The connection terminal group 29c is connected to the armature coil 9b with a junction terminal 29d as shown in FIG. 10, and is also connected to the rectifier unit 21 by tightening the junction terminal 29d to the connection terminal 36a of the circuit board 36 with a screw 37 in the axial direction of the rotary shaft 3.

The assembly procedure of the above-described vehicle generator will be described next. The diodes 34a and 34b are soldered to the cooling plates 32 and 33 with high-temperature solder. Then, the cooling plate 33 and the overlap-joint section 32d of the cooling plate 32 are overlapped, with the mold insulator 35 being placed therebetween, and assembled to make a partially assembled product shown in FIG. 4 and FIG. 5. The circuit board 36 is placed on this partially assembled product with the mold insulator 35 being used as a guide, and the connection terminals 36a are inserted between the anode leads 34al and the cathode leads 34bl of the diodes. Then, the anode leads 34al, the cathode leads 34bl, and the reeds 36e of the connection terminals 36a are combined by spot welding, or another method used to connect electrically (see FIG. 10), making the product shown in FIG. 1. The reeds 36e of the connection terminals 36a are spot-welded with the leads 34al and 34bl, which have an opening in the up and down direction of the figure, so as to be able to easily insert the electrodes of a spot welding machine, as shown in FIG. 8 and FIG. 9.

The rectifier unit 21, assembled as shown in FIG. 1, is inserted into the rear bracket 22 shown in FIG. 10 such that the cooling plate 32 for the positive-electrode side is mounted in the indented section 22a of the bracket, and the cooling plate 33 for the negative-electrode side is tightened to the rear bracket 22 with a tightening bolt (not shown). It is inserted into the fixing holes 32e and 33e with the direct-connection surface 33b of the cooling plate 33 butting against the direct-connection section 22b of the bracket so that the mounting surface 33a sufficiently contacts with the direct-connection section 22b in order to conduct heat.

The armature 9 is arranged such that the coil winding is finished and the terminals of the connection terminal group 9c of the armature coil 9b are treated. That is, the junction terminals 29d are connected by soldering to the terminals 29c using an arch shape piece protruding in parallel with shaft 3. The armature 9, to which the junction terminals 29d are connected, are combined with the rear bracket 22 in which the rectifier unit 21 is assembled, as shown in FIG. 10. The junction terminals 29d for the armature coil are tightened to the connection terminals 36a of the circuit board 36 with screws 37. Then, field iron cores 5a and 5b, attached over the rotary shaft 3, are inserted into the armature 9.

In the generator configured as described above, cooling air flows along the routes indicated by dotted lines and arrows C to F in FIG. 10. When a cooling fan 7b, serving as a centrifugal fan, draws air due to the rotation of the rotary shaft 3, air flows D and E are formed. Air flows D and E pass from the surroundings of the rotary shaft 3 to the inner surface of the cooling fan 7b through the fins 22c of the rear bracket, the vent hole 22e, and the cooling fins 32b of the cooling plate 32. In the same way, air is drawn from the vent hole 22d in the axial direction along flow C. Air drawn from the vent hole 22g passes through the surroundings of the connection terminal group 29c along air flow F. The air cools the armature coil 9b and passes through the vent hole 22h.

Figure 24:
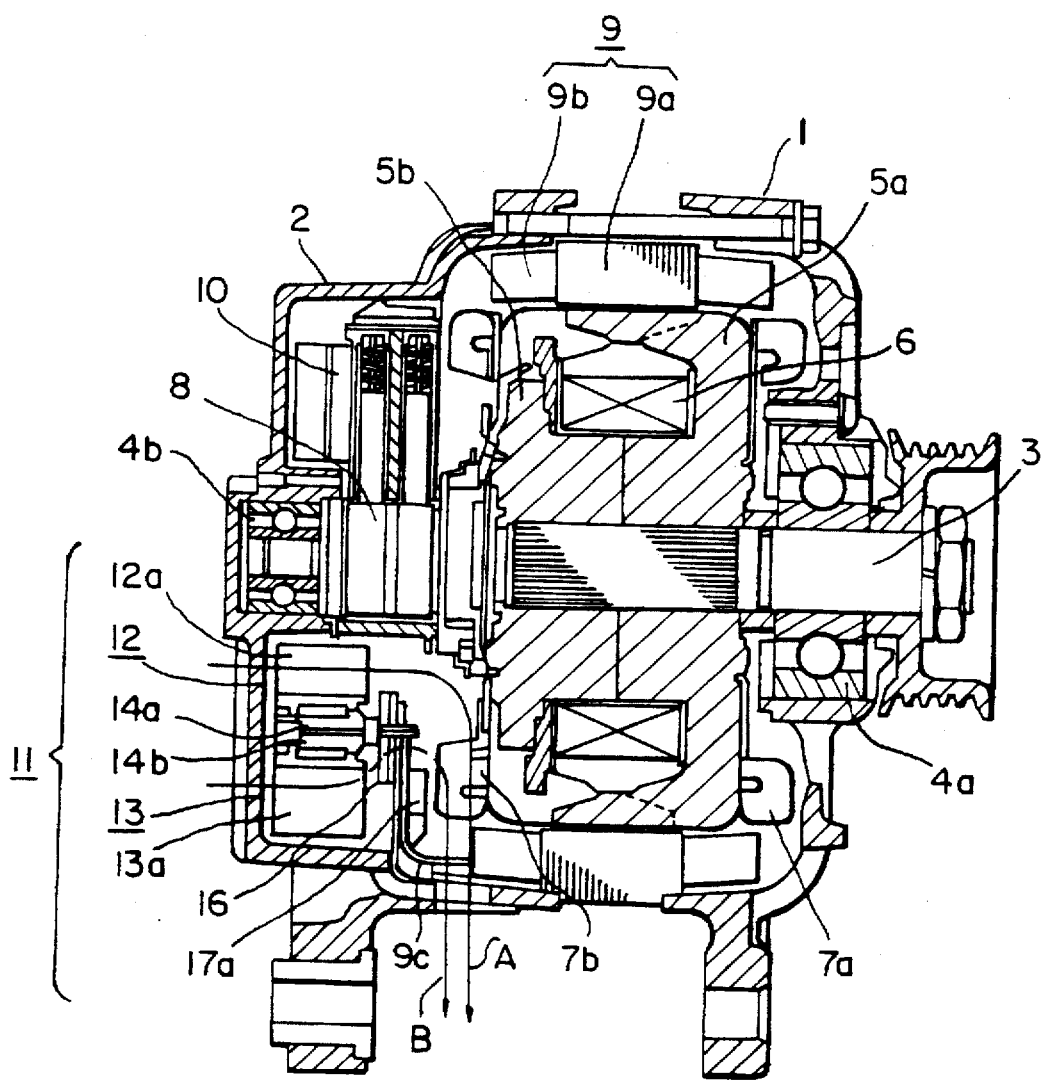
FIG. 24 is a sectional view illustrating a conventional AC generator.

Although a partitioning plate 17 has a shape slightly different from that of the conventional one shown in FIG. 24, it plays the same role.

In the AC generator, according to this embodiment, the mounting surfaces 32b and 33b of the cooling plates 32 and 33, to which diodes are to be mounted, are placed on the same plane perpendicular to the rotary shaft 3 as shown in FIG. 5 and FIG. 10. Diodes 34a and 34b are also placed on the same plane perpendicular to the rotary shaft. As a result, the axial length of the rectifier unit 21 and of the generator advantageously can be reduced.

Since the cooling fins 32b and fins 22c are radially arranged such that both fins diametrically overlap with the same pitch angles of the fins and cooling air flows as described above, cooling efficiency improves.

The cooling plate 33 for the negative-electrode side is mainly cooled by the fins 22c located on the rear bracket 22. Other portions of the rear bracket 22 also contribute to heat radiation, increasing the cooling efficiency. In some cases, even if the fins 22c of the rear bracket 22 are removed, sufficient heat radiation can be obtained.

The circuit board 36, having insert-molded connection terminals 36a, can be connected to the junction terminals 29d in the axial direction of the rotary shaft 3 with screws 37, facilitating connection to the armature coil 9b without soldering, thus allowing the number of fabrication processes to be reduced.

Embodiment 2

FIG. 12 is a sectional view illustrating the main section of a vehicle AC generator according to another embodiment of the invention. In FIG. 12, a well known heat-conductive silicone grease 39 is applied between the cooling plate 33 for the negative-electrode side and the direct-connection section 22b of the rear bracket 22. With this silicone grease 39, a sufficient contact area is obtained, thereby improving heat-conductivity between the cooling plate 33 and rear bracket 22 and increasing the cooling efficiency of diodes.

In the embodiment shown in FIG. 1, the contact surfaces of the cooling plate 33 and the rear bracket 22 must be finished with substantial precision in order to provide a good path for heat conduction. Applying the silicone grease 39 between the plate 33 and bracket 22 ensures formation of a sufficient contact area, even if the respective contact surfaces have some protrusions and cavities, providing good heat conductivity. Other elastic materials such as types of silicone rubber having good heat conductivity may be used.

Embodiment 3

FIG. 13 is an elevation illustrating a part of a rectifier unit 21 according to still another embodiment of the invention. Each of diodes 44a, 44b, and a base electrode have a triangular shape at its tip and a pentagonal shape as a whole. The diodes 44a are radially mounted on the cooling plate 33 for the positive-electrode side which is placed inside, as shown in the FIG. 13. Since the diodes 44a have a pentagonal shape, by cutting the bottom corners, a plurality of the diodes 44a can be closely mounted. In the figure, however, the diodes are not closely mounted. The diodes 44b are not necessarily polygonal; they preferably have the same shape for reasons of compatibility and other factors.

Figure 14:
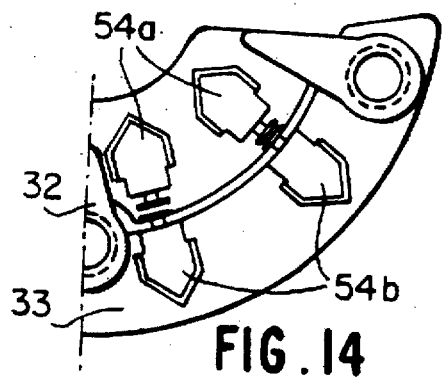
FIG. 14 is an elevation of a rectifier unit according to still another embodiment of the invention.
Figure 15:
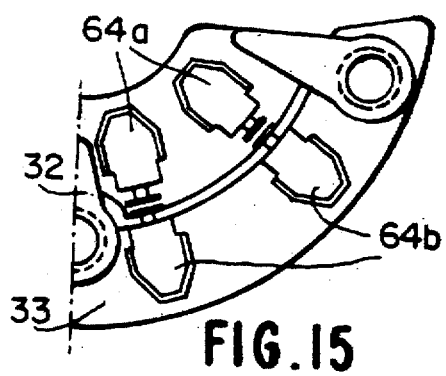
FIG. 15 is an elevation of a rectifier unit according to yet another embodiment of the invention.

As shown in FIG. 14 and FIG. 15, diodes 54a and 54b, having a pentagonal shape with an slightly larger apex angle than that illustrated in FIG. 13, or diodes 64a and 64b, having a hexagonal shape, may advantageously be used.

Embodiment 4

Figure 16:
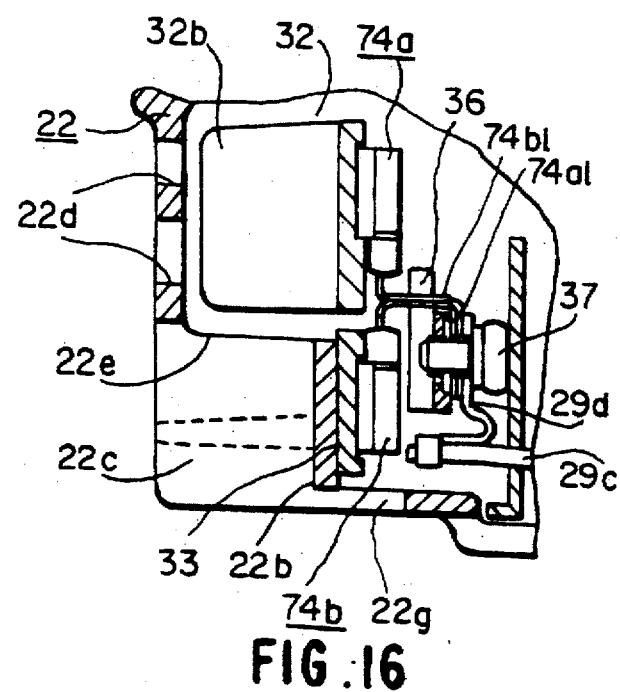
FIG. 16 is a sectional view of the main section of a vehicle AC generator according to a further embodiment of the invention.
Figure 17:
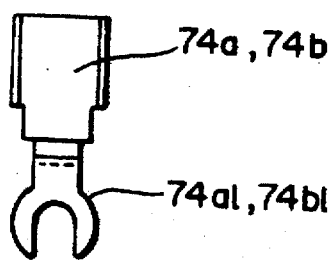
FIG. 17 is a plan illustrating the lead shape of a diode used in the embodiment shown in FIG. 16.

FIG. 16 is a sectional view illustrating the main section of the AC generator according to yet another embodiment of the present invention. FIG. 17 is a diagram showing the shape of diode leads. In these figures, the leads 74al and 74bl of diodes 74a and 74b serve as first and second connection conductors. They are longer than leads 34al and 34bl used in the first embodiment shown in FIG. 5, and have claw-like terminals which can be tightened together with the junction terminals 29d of the armature coil 9b. The coil serves as a third connection conductor, with the screws 37 using the circuit board 36 as a junction.

Figure 18:
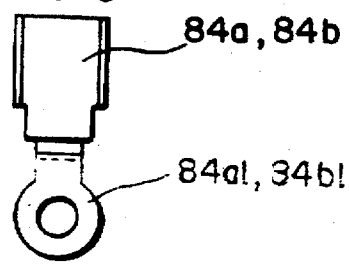
FIG. 18 is a plan illustrating the lead shape of a diode used in a yet further embodiment of the invention.

In FIG. 18, which is a diagram illustrating another example of a lead shape, leads 84al and 84bl may have ring-shaped terminals. With use of these leads, leads 74al and 74bl and the junction terminals 29d of the armature coil 9b can be collectively tightened and connected to the terminals 36a of the circuit board 36, shown in FIG. 1, with the screws 37. Therefore, work corresponding to welding of the connection terminals 36a and leads 34al and 34bl in the embodiment shown in FIG. 1 can be eliminated.

Embodiment 5

Figure 19:
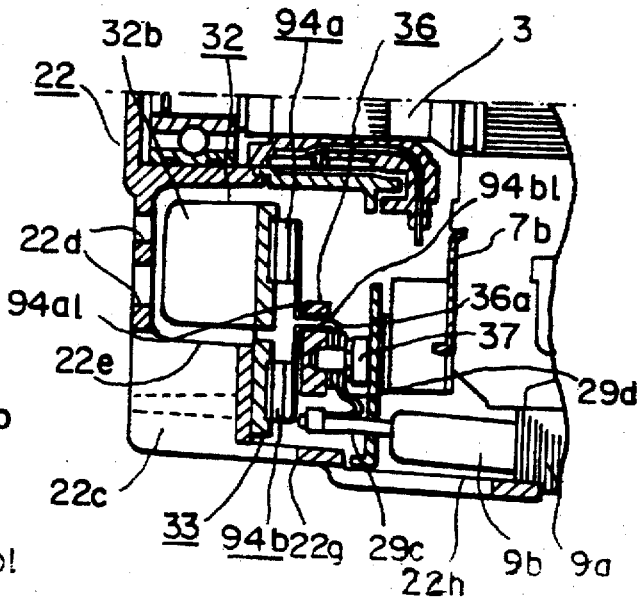
FIG. 19 is a sectional view of the main section of a AC generator according to a still further embodiment of the invention.
Figure 20:
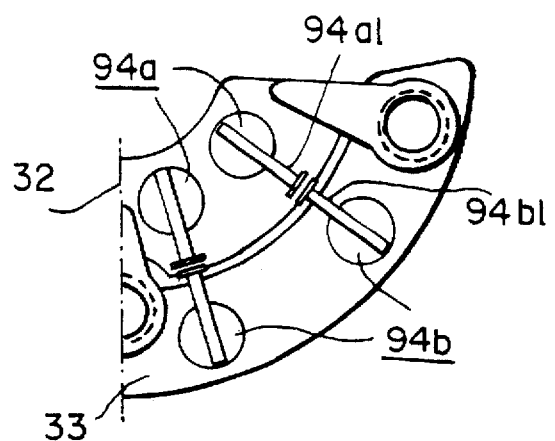
FIG. 20 is an elevation illustrating a part of a rectifier unit according to the embodiment shown in FIG. 19.

FIG. 19 and FIG. 20 show a further embodiment of the invention. FIG. 19 is a sectional view illustrating the main section of the AC generator. FIG. 20 is an elevation illustrating a part of a rectifier unit. As shown in these figures, button-shaped diodes 94a and 94b have anode electrode plates and cathode electrode plates at both sides of the disk. One electrode plate is directly soldered to the cooling plates 32 and 33, and the other electrode plate is soldered to leads 94al and 94bl. The leads 94al and 94bl and the reed sections 36e of the connection terminals 36a of the circuit board 36 can be connected by spot welding, similar to the embodiment shown in FIG. 1.

These button-shaped or disk-shaped diodes 94a and 94b can be mounted radially on the cooling plate 32 with a short interval in the same way as in the embodiment shown in FIGS. 13–15 due to their shape.

Embodiment 6

Figure 21:
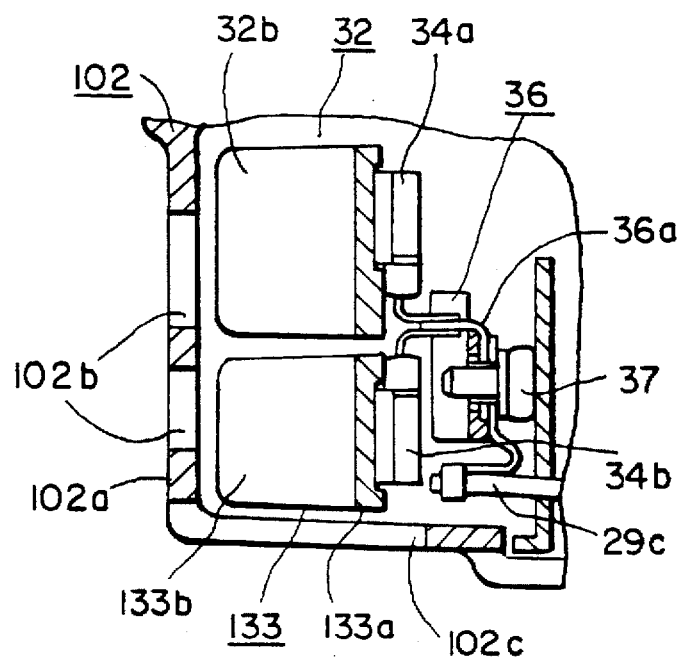
FIG. 21 is a sectional view of the main section of a AC generator according to another embodiment of the invention.

In the embodiment shown in FIG. 1, the cooling plate 33 is not provided with cooling fins, but, the rear bracket 22 is equipped with fins 22c. The cooling plate 33 may be arranged such that it is provided with cooling fins and mounted in the rear bracket 22. FIG. 21 is a sectional view of the main section of the AC generator, showing an exemplary embodiment. In FIG. 21, a hollow, cylindrical, rear bracket 102 has a bottom wall 102a. Vent holes 102b axially going through the bottom wall 102a and a vent hole 102c diametrically goes through the bracket 102 at the outer peripheral portion. The cooling plate 133 is also provided with a plurality of protruded cooling fins 133b on the surface opposite the mounting surface 133a, for diodes 34b, and is mounted in the bracket 102 after being combined with the cooling plate 32.

The cooling fins 133b are arranged such that they are displaced radially with respect to the rotary shaft and overlap the cooling fins 32b. Cooling air caused by the cooling fan 7b flows in the same way as that for the embodiment shown in FIG. 16, which air efficiently cools the fins 133b and 32b.

Embodiment 7

FIG. 22 is a sectional view of the main section of the AC generator according to yet another embodiment of the invention. In FIG. 22, a rear bracket 202 has a plurality of radial fins 202b protruding from the bottom section 202a. Vent holes 202c, going through the rear bracket 202 axially, are provided between fins 202b and rotary shaft 3. A cooling plate 232 is not equipped with cooling fins. The cooling plates 232 and 33, assembled in advance, are mounted to the bracket 202 with sufficient contact areas so as to conduct heat efficiently. An insulation sheet 239, which has electrical insulating characteristics and is made from an insulation material having good heat conductivity, is placed between the cooling plate 232 and the bracket 202. The cooling plate 33 is directly mounted to the inside of the bottom section 202a of the bracket.

In this case, air flows through the outside of the rear bracket 202 to cool the fins 202b and then into the AC generator at the vent hole 202c, as shown by the dashed lines and arrows G and H in FIG. 22. The air is exhausted to the outside of the generator with the armature coil 9 being cooled in the same way as for the embodiment shown in FIG. 10.

Embodiment 8

In the above-described embodiment, the bracket is used as a casing member. A cover may be provided in addition to the bracket, as a casing member. FIG. 23 is a sectional view of the main section of the AC generator, illustrating such an embodiment. In FIG. 23, a hollow, cylindrical, rear bracket 302, mounted at the bottom, has vent holes 302a near the center for introducing air into the AC generator. The radial vent holes 302a are fan-shaped. A cover 340, serving as a casing member, is mounted to the rear bracket 302 and covers the cooling plates 32 and 133, and the cooling fins 32b and 133b.

Air created by the cooling fan 7b, as shown by the dashed lines and arrows J and K in FIG. 23, flows into the inside of a cover 340 at a vent hole (not shown). The air then flows into the AC generator through the vent holes 302a of the rear bracket, and is exhausted to the outside of the AC generator, with the armature coil 9 being cooled in the same way as that for the embodiment shown in FIG. 10.

Other Embodiments

In the above-described embodiments, the negative-electrode side is grounded. The positive-electrode side may be grounded with the diodes being connected in reverse polarity. In the disclosed embodiments, the cooling plates for the negative-electrode side are arranged diametrically to the cooling plate for the positive-electrode side. The positions of the cooling plates may also be reversed. Furthermore, in the embodiment shown in FIG. 1, protruding overlap-joint sections may be provided for the cooling plate 33 in order to overlap, as opposed to being placed on, the cooling plate 32.

The mounting surfaces 32a and 33a of the cooling plates 32 and 33 are not necessarily planar. These mounting surfaces are required to be almost on the same plane perpendicular to the rotary shaft 3. They may be shifted to some extent, while not impeding the reduction in the length of the AC generator in the axial direction.

The radial cooling fins of the cooling plates and the fins of the rear bracket are provided as a preferable embodiment. They may be provided in other ways.

In the embodiment shown in FIG. 23, the cooling plates 32 and 133 are provided with the cooling fins 32b and 133b, respectively. The fins may be placed on the cover 340 instead of the cooling plates 32, 133. The cover and the cooling plates may be configured such that one plate is provided with fins (as shown in the embodiment of FIG. 1). The other cooling plate, not provided with fins, is mounted to the cover 340 ensuring good heat conductivity and heat radiation from the cover.

In the various embodiments, the diodes, having planar electrodes are soldered to the cooling plates. The diodes may be mounted with crimping. The diodes advantageously may be in canned-type, stud-type, or other packages. A rectifier unit can be configured without using metallurgical connection methods, i.e., as soldering and welding, improving heat-resistance, if canned-type diodes are crimped after being half-embedded in the cooling plates or when stud-type diodes are used.

Vehicle AC generators of this type usually have fans to cool the inside of the generator. However, even if cooling fans are not provided, the same effects can be obtained. Instead of cooling fans, a water cooling system, in which cooling water flows through the bracket, may be used. In a variation of FIG. 22, the rear bracket 202 may be provided with a water-cooling jacket, for example, instead of using the heat radiating fins 202b made on the rear bracket.

Even when an AC generator uses an almost-sealed water cooling system, or a sealed water cooling system, having inside cooling fans for stirring air, the embodiment shown in FIG. 21 or FIG. 23, for example, can be applied with a slight design modification.

The invention has been described with respect to certain preferred embodiments. Various modifications and additions within the spirit of the invention will occur to those of skill in the art. Accordingly, the scope of the invention is limited solely by the following claims.

What is claimed is:

1. A vehicle AC generator having a main unit comprising:
   a rotor disposed in the main unit of said generator and journaled at a rotary shaft;
   a rectifier unit for rectifying AC current, having a plurality of unidirectionally conducting devices, and positive-electrode and negative-electrode side support members having respective surfaces for respectively supporting a positive-electrode and a negative-electrode side of said unidirectionally conducting devices, said support members supporting said unidirectionally conducting devices which are positioned on substantially the same plane, which plane is perpendicular to the longitudinal axis of said rotary shaft, wherein said first and second support members are provided with overlap-joint sections which overlap each other in the axial direction of said rotary shaft, protruding cooling fins disposed on said respective support members at sides opposed to respective sides on which said unidirectional conducting devices are supported, and a circuit board having portions which respectively overlap said support members for electrically connecting said unidirectionally conducting devices; and a casing member covering at least one of said support members.

2. The vehicle AC generator according to claim 1, wherein said support members are configured with a first support member and a second support member both having substantially arcuate-belt shaped planes with different internal diameters such that said planes are positioned substantially on the same plane, perpendicular to said rotary shaft, wherein said first and second support members are arranged so as to overlap diametrically, and wherein said first and said second support members support said unidirectionally conducting devices.

3. The vehicle AC generator according to claim 2, wherein said respective said support members are integrated by axially tightening said overlap-joint sections with tightening members.

4. The vehicle AC generator according to claim 3, further comprising a cooling fan, wherein said cooling fan rotates together with said rotary shaft and thereby draws outside air into the inside of the main unit of said generator for cooling, wherein said cooling fan cools said cooling fins.

5. The vehicle AC generator according to claim 4, wherein one of said cooling fins and heat-radiating fins are formed substantially radially with respect to the longitudinal axis of said rotary shaft.

6. The vehicle AC generator according to claim 2, wherein said positive electrode side of said unidirectionally conducting devices and said negative electrode side of said unidirectionally conducting devices are disposed adjacent one another along a straight line which forms a diameter of said rotary shaft, and wherein said unidirectionally conducting devices are circular.

7. A vehicle AC generator having a main unit comprising:

a rotor disposed in the main unit of said generator and journaled at a rotary shaft;

a rectifier unit for rectifying AC current, having a plurality of unidirectionally conducting devices, and positive-electrode and negative-electrode side support members having respective surfaces for respectively supporting a positive-electrode and a negative-electrode side of said unidirectionally conducting devices, said support members supporting said unidirectionally conducting devices which are positioned on substantially the same plane, which plane is perpendicular to the longitudinal axis of said rotary shaft, one of said support members having a section extending from said plane and overlapping the other of said support members for interconnecting said support members, and a circuit board having portions which respectively overlap said support members for electrically connecting said unidirectionally conducting devices;

a casing member covering at least one of said support members;

a cooling fan which rotates together with said rotary shaft and draws outside air into the inside of the main unit of said generator for cooling; and protruded cooling fins disposed on at least one of said support members at a side opposed to a respective side on which said unidirectional conducting devices are supported;

said casing member having an indented section which forms a chamber in an axial direction of said rotary shaft from an unindented section of said casing member, and a respective one of said support members from which said cooling fins protrude is located in said indented section and the other of said support members is secured to said casing member to conduct heat, and wherein said cooling fan cools said cooling fins.

8. The vehicle AC generator according to claim 7, wherein said casing member supports heat-radiating fins located at an outside portion of a respective position where at least one of said support members is secured, and wherein said cooling fan cools said cooling fins and said heat-radiating fins.

9. The vehicle AC generator according to claim 8, wherein at least one of said cooling fins and heat-radiating fins are formed substantially radially with respect to the longitudinal axis of said rotary shaft.

10. The vehicle AC generator according to claim 8, wherein said cooling fins are formed at the same pitch angle relative to the longitudinal axis of said rotary shaft as said heat-radiating fins such that respective ones of said cooling fins are arranged substantially radially with respect to said rotary shaft and overlap respective ones of said heat-radiating fins diametrically with respect to said rotary shaft, and wherein through holes, which holes extend through said casing member diametrically with respect to said rotary shaft, are provided between said heat radiating fins of said casing member.

11. The vehicle AC generator according to claim 7, wherein at least one of said support members is secured to said casing member with heat-conductive elastic members placed therebetween.

12. The vehicle AC generator according to claim 7, wherein said casing member is a bracket which journals said rotor.

13. The vehicle AC generator according to claim 7, wherein said casing member is a cover provided at the outside of said bracket which journals said rotor.

14. The vehicle AC generator according to claim 1, wherein said support members are secured to said casing member such that both said support members are capable of conducting heat and at least one of said support members is secured to said casing member with an electric insulation member placed therebetween.

15. The vehicle AC generator according to claim 14, further comprising a cooling fan which rotates together with said rotary shaft and which draws outside air into the main unit of said generator for cooling; and heat-radiating fins disposed at an outside respective position wherein said support members are secured to said casing member, wherein said cooling fan cools said heat-radiating fins.

16. The vehicle AC generator according to claim 15, wherein one of said cooling fins and said heat-radiating fins are formed substantially radially with respect to said rotary shaft.

17. The vehicle AC generator according to claim 14, wherein at least one of said support members is secured to said casing member with heat-conductive elastic members placed therebetween.

18. The vehicle AC generator according to claim 14, wherein said casing member is a bracket which journals said rotor.

19. The vehicle AC generator according to claim 14, wherein said casing member is a cover provided outside of said bracket which journals said rotor.

20. The vehicle AC generator according to claim 1, further comprising: first and second connection conductors, wherein said first connection conductors are connected to said unidirectionally conducting devices for said positive-electrode side opposing said second connection conductors connected to said unidirectionally conducting devices for said negative-electrode side; and third connection conductors placed therebetween, wherein said first, second, and third connection conductors are electrically connected.

21. The vehicle AC generator according to claim 1, further comprising first through third connection conductors wherein said first connection conductors, connected to said unidirectionally conducting devices for said positive-electrode side, overlap in the axial direction of said rotary shaft said second connection conductors, connected to said unidirectionally conducting devices for said negative-electrode side, and wherein said first and second connection conductors are electrically connected to third connection conductors with means for tightening.

22. The vehicle AC generator according to claim 21, further comprising an insulation support member molded integrally with said third connection conductors using an electric insulation molding material, wherein said insulation support member is disposed so as to overlap at least one of said support members in the axial direction.

23. A vehicle AC generator having a main unit comprising:

a rotor disposed in the main unit of said generator and journaled at a rotary shaft;

a rectifier unit for rectifying AC current, having a plurality of unidirectionally conducting devices, and positive-electrode and negative-electrode side support members having respective surfaces for respectively supporting a positive-electrode and a negative-electrode side of said unidirectionally conducting devices, said support members supporting said unidirectionally conducting devices which are positioned on substantially the same plane, which plane is perpendicular to the longitudinal axis of said rotary shaft, one of said support members having a section extending from said plane and overlapping the other of said support members for interconnecting said support members, and a circuit board having portions which respectively overlap said support members for electrically connecting said unidirectionally conducting devices; and a casing member covering at least one of said support members, wherein said support members are configured with a first support member and a second support member both having substantially arcuate-belt shaped planes with different internal diameters such that said planes are positioned substantially on the same plane, perpendicular to said rotary shaft, wherein said first and second support members are arranged so as to overlap diametrically, and wherein said first and second support members support said unidirectionally conducting devices; and wherein said positive electrode side of said unidirectionally conducting devices is aligned along a straight line which forms a diameter of said rotary shaft with said negative electrode side of said unidirectionally conducting devices with respect to said rotary shaft, and wherein said unidirectionally conducting devices are shaped in the form of a rectangle with two corners removed.

* * * * *